(12) United States Patent
Oda (10) Patent No.: US 11,971,538 B2
(45) Date of Patent: Apr. 30, 2024

(54) OPTICAL SCANNING DEVICE

(71) Applicant: STANLEY ELECTRIC CO., LTD., Tokyo (JP)

(72) Inventor: Yutaro Oda, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 453 days.

(21) Appl. No.: 17/360,993

(22) Filed: Jun. 28, 2021

(65) Prior Publication Data

US 2022/0003984 A1 Jan. 6, 2022

(30) Foreign Application Priority Data

Jul. 2, 2020 (JP) .................. 2020-115171

(51) Int. Cl.
*G02B 26/08* (2006.01)
*G02B 26/10* (2006.01)

(52) U.S. Cl.
CPC ....... *G02B 26/0858* (2013.01); *G02B 26/101* (2013.01); *G02B 26/103* (2013.01)

(58) Field of Classification Search
CPC . G02B 26/0858; G02B 26/101; G02B 26/103
See application file for complete search history.

(56) References Cited

U.S. PATENT DOCUMENTS 10,838,197 B2 11/2020 Yamada
2019/0196176 A1* 6/2019 Yamada ............... G02B 26/101
2020/0209616 A1* 7/2020 Takahashi .......... G02B 26/0858

FOREIGN PATENT DOCUMENTS

JP 2019113605 A 7/2019

* cited by examiner

*Primary Examiner* — Euncha P Cherry
(74) *Attorney, Agent, or Firm* — Holtz, Holtz & Volek PC

(57) ABSTRACT

Provided is an optical scanning device capable of preventing abnormal vibration occurring in a micro mirror. The optical scanning device includes a micro mirror that reflects light beams, torsion bars that rotate the micro mirror around a Y-axis, a movable frame that is disposed around the micro mirror, and meander-type piezoelectric actuators that rotate the micro mirror around an X-axis. The movable frame has a rectangular shape, and has a rib provided on the rear surface of the movable frame. Corner regions of four corners of the movable frame have a removal region where no rib is partially provided or a rib with a thickness thinner than other regions is provided.

8 Claims, 6 Drawing Sheets

| Removed Size [μm] | 0 | 200 (Frame 2a) | 350 | 400 |
|---|---|---|---|---|
| Deflection Angle $Z_1$ [°] | 0.0382 | 0.0402 | 0.0320 | 0.0281 |
| Deflection Angle $Z_2$ [°] | 0.00317 | 0.00333 | 0.00977 | 0.01218 |

| Removed Size [μm] | 500 (Frame 40a) | 550 | 500 + 200 Leaving Region |
|---|---|---|---|
| Deflection Angle $Z_1$ [°] | 0.0232 | 0.0242 | 0.0042 |
| Deflection Angle $Z_2$ [°] | 0.0151 | 0.01496 | 0.0228 |

(c) Movable Frame 50a (b) Movable Frame 40a (a) Movable Frame 2a

OPTICAL SCANNING DEVICE

This application claims the priority benefit under 35 U.S.C. § 119 of Japanese Patent Application No. 2020-115171 filed on Jul. 2, 2020, which is hereby incorporated in its entirety by reference.

TECHNICAL FIELD

The presently disclosed subject matter relates to an optical scanning device with an optical deflector used for creating a light distribution pattern or the like.

BACKGROUND ART

Conventionally known optical scanning devices used in vehicular headlights or the like include optical deflectors that scan light emitted from a light source. Such optical deflectors can be produced by a MEMS (Micro Electro Mechanical Systems) technique.

For example, Japanese Patent Application Laid-Open No. 2019-113605 (Patent Document 1, or U.S. Pat. No. 10,838,197B2 corresponding thereto) discloses an optical scanning device with an optical scanner, which includes a mirror, a mirror support, a torsion beam, a coupling beam, a horizontal driving beam, a movable frame, a vertical driving beam, and a fixed frame. The mirrors supported on the upper surface of the mirror support.

The movable frame in the area X2 has a portion whose inner surface is inclined and angled with respect to the vertical-rotation axis V and the horizontal-rotation axis H and a portion whose inner surface is parallel to the vertical-rotation axis V The portion whose inner surface is inclined and angled with respect to the vertical-rotation axis V and the horizontal-rotation axis H becomes wider as the distance from the vertical-rotation axis V increases, with corners being provided in this portion.

In the area X1, ribs are removed to reduce the weight. Thus, the mirror and the mirror support are adjusted so that one side thereof is made heavier than the other side opposite thereto with respect to the vertical-rotation axis V (see Patent Document 1, in particular, paragraphs 0021 and 0038, and FIG. 4).

In the optical scanning device of Patent Document 1, the vibration of the mirror is propagated from the horizontal-rotation axis H to the vertical-rotation axis V through the movable frame. However, when the vibration propagates to the vertical-rotation axis V, it causes abnormal vibration of the mirror, which may adversely affect the optical scanning.

SUMMARY

The presently disclosed subject matter has been made in view of the circumstances described above, and an object thereof is to provide an optical scanning device capable of preventing abnormal vibration occurring in a mirror.

The presently disclosed subject matter was devised in view of these and other problems and features in association with the conventional art. According to an aspect of the presently disclosed subject matter, an optical scanning device includes: a mirror unit configured to reflect light beams; a first drive unit configured to rotate the mirror unit around a first drive axis; a movable frame that is connected to the mirror unit on the first drive axis and is situated around the mirror unit; and a second drive unit that is connected to the movable frame on a second drive axis perpendicular to the first drive axis, the second drive unit being configured to rotate the mirror unit around the second drive axis. The movable frame has a rectangular shape and has a rib that is provided on a rear surface of the movable frame, and corner regions of four corners of the movable frame have an absence region which is any one of a region where no rib is partially provided and a region where a rib with a thickness thinner than other regions is provided.

The optical scanning device according to the presently disclosed subject matter can scan light beams by rotating the mirror unit around the first drive axis and around the second drive axis. Since the movable frame is connected to the second drive unit on the second drive axis, the rotation of the movable frame causes the rotation of the mirror unit around the second drive axis.

Although the rear surface of the movable frame has ribs for reinforcement, the corner regions of the four corners of the movable frame have an absence region where no rib is partially provided, or a rib with a thickness thinner than that of the other regions is provided. Thus, the vibration due to the rotation of the mirror unit around the first drive axis does not propagate to the position of the second drive axis due to interruption by the absence region. Thus, it is possible to prevent abnormal vibration occurring in the mirror unit.

In the optical scanning device according to the presently disclosed subject matter, the absence region may preferably be provided in an overlapping section where, among four side sections constituting the rib, two side sections in different directions are overlapped with each other.

According to this configuration, the absence region is an overlapping section where two side sections having different directions are overlapped with each other, so that the overlapping section is a square or a rectangle at four corners of the rectangular rib. Since, with this configuration, the propagation of vibration is suppressed in the corner region of the movable frame, any abnormal vibration of the mirror unit can be prevented.

In the optical scanning device according to the presently disclosed subject matter, the absence region may preferably be a region that is a combination of the overlapping section and a side section extending a predetermined length from the overlapping section.

According to this configuration, the absence region is an L-shaped section which is the combination of the overlapping section and the side sections of the four corners of the rectangular rib. Changes to the shape of the absence region can effectively eliminate a vibration mode in which abnormal vibration of the mirror unit is likely to occur.

In the optical scanning device according to the presently disclosed subject matter, the absence region may preferably be provided in a side section extending a predetermined length from an overlapping section where, among four side sections constituting the rib, two side sections in different directions are overlapped with each other, except for the overlapping section.

According to this configuration, the absence region has a shape obtained by removing the overlapping section (square or rectangle at the four corners) among the L-shaped sections at the four corners of the rectangular rib. Thus, while suppressing the abnormal vibration of the mirror unit, it is possible to adjust the magnitude of the vibration of the corner region of the movable frame.

In the optical scanning device according to the presently disclosed subject matter, the corner region may preferably be configured so that the value of the deflection angle of the second drive axis per 1 degree of the deflection angle of the mirror unit is equal to or less than 0.0353 degrees.

When the mirror unit vibrates so that the value of the deflection angle of the second drive axis per 1 degree of the deflection angle of the mirror unit is equal to or less than 0.0353 degrees, the corner regions of the movable frame can negate the decrease in the deflection angle of the mirror unit. Thus, abnormal vibration of the mirror unit can be prevented.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
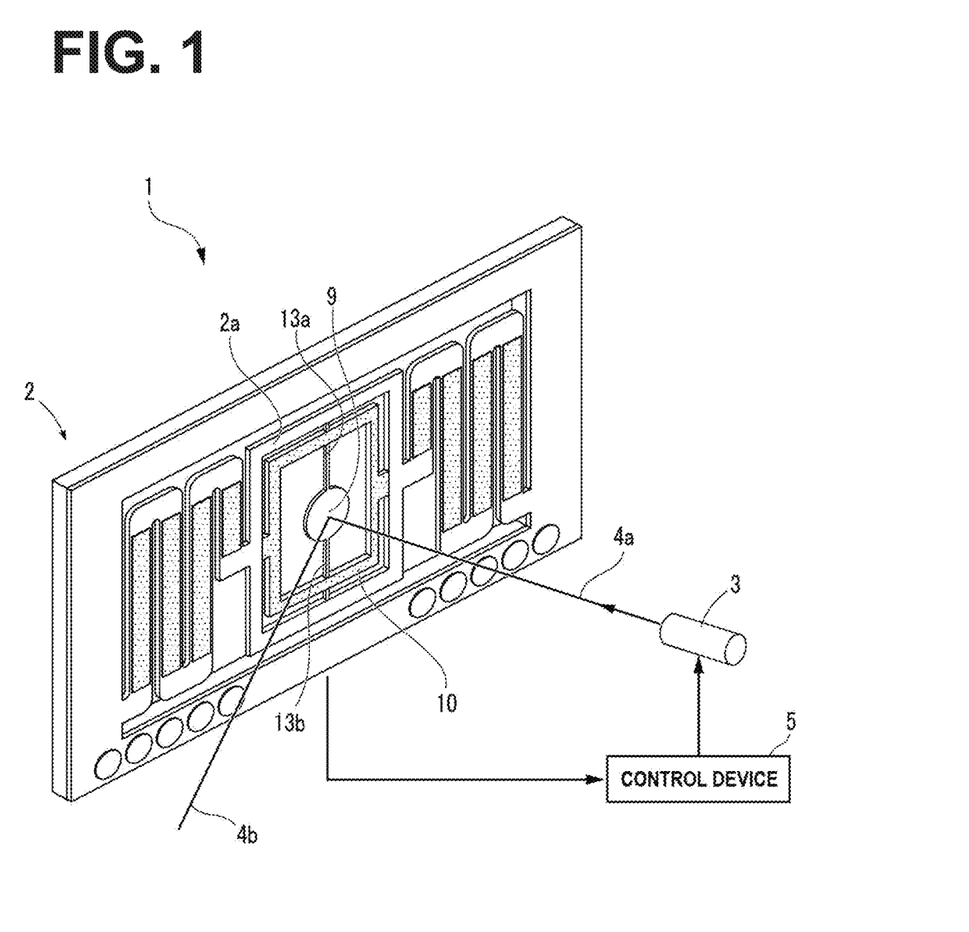
FIG. 1 is a perspective view of an optical scanning device made in accordance with principles of the presently disclosed subject matter.

A description will now be given below of the optical scanning devices of the presently disclosed subject matter with reference to the accompanying drawings in accordance with exemplary embodiments. FIG. 1 is a perspective view of an optical scanning device 1 according to the presently disclosed subject matter. The optical scanning device 1 is a device used for, for example, small projectors, seamless adaptive driving beam (ADB) systems, light detection and ranging (LIDAR) systems, etc. The optical scanning device 1 is mainly composed of a two-dimensional optical deflector 2, a laser light source 3, and a control device 5.

The two-dimensional optical deflector 2 is produced using a semiconductor-processing or MEMS technique. The two-dimensional optical deflector 2 is configured to reflect light incident from a certain direction with a micro mirror 9 (the "mirror unit" of the presently disclosed subject matter) which is rotated about an axis to project this light as scanning light.

The two-dimensional optical deflector 2 includes a movable frame 2a, and further includes, inside the movable frame 2a, a micro mirror 9, a rectangular piezoelectric actuator 10, torsion bars 13a and 13b which are each a horizontal driving beam (the "first drive unit" of the presently disclosed subject matter), and the like. Laser beams 4a emitted from the laser light source 3 are reflected by the micro mirror 9, so that the reflected light (laser beams 4b), for example, scans a projection surface located in front of the small projector.

The control device 5 transmits a control signal to the movable frame 2a and the laser light source 3 by not-shown wirings. The control signal activates the rectangular piezoelectric actuator 10 of the movable frame 2a, and the torsion bars 13a and 13b coupled thereto are then twisted, thereby rotating the micro mirror 9. Further, the control device 5 sends control signals to control the emission of the laser beams 4a from the laser light source 3 as well as brightness of the laser light source 3.

Figure 2:
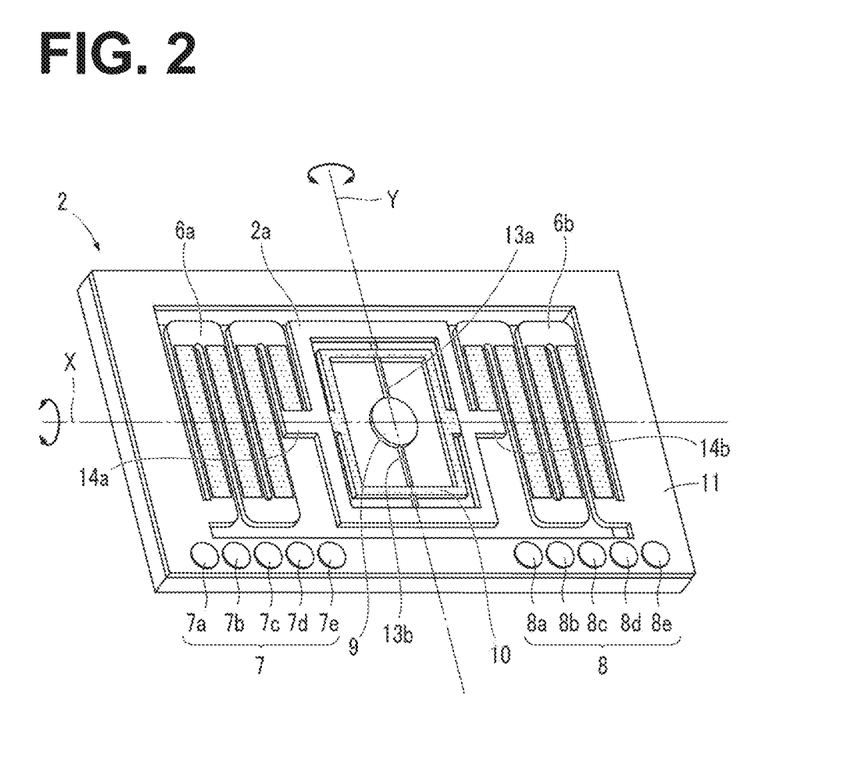
FIG. 2 is a diagram illustrating details of a two-dimensional optical deflector of the optical scanning device.

As shown in FIG. 2, the two-dimensional optical deflector 2 includes an outer frame support 11, at the center of which the movable frame 2a is located. Further, the two-dimensional optical deflector 2 includes meander-type piezoelectric actuators 6a and 6b as a vertical drive unit (the "second drive unit" of the presently disclosed subject matter), which are situated on both sides of the movable frame 2a (in an X-axis direction in the drawing). The meander-type piezoelectric actuators 6a and 6b are coupled to outer side sections of the movable frame 2a, respectively, as well as being coupled to inner side sections of the outer frame support 11, respectively.

The meander-type piezoelectric actuators 6a and 6b have a structure in which a plurality of cantilevers are arranged in such a way that the adjacent cantilevers are parallel to each other and are folded in at the ends to be serially coupled to each other. Although details will be described later, the meander-type piezoelectric actuators 6a and 6b are activated to reciprocally rotate the movable frame 2a about the X-axis (the "second drive axis" of the presently disclosed subject matter) as illustrated in FIG. 2.

Further, as described above, the rectangular piezoelectric actuator 10 is activated to reciprocally rotate the micro mirror 9 about the Y-axis (the "first drive axis" of the presently disclosed subject matter) as illustrated in FIG. 2, which coincides with the axis of the torsion bars 13a and 13b.

The micro mirror 9 is supported by the torsion bars 13a and 13b extending in the Y-axis direction, so as to be situated at the center of the rectangular piezoelectric actuator 10. The reflecting surface of the micro mirror 9 is provided with a metal thin film of, e.g., Au, Pt, or Al, formed by a sputtering method or an electron beam evaporation method. The shape of the micro mirror 9 is not limited to a circular shape, and may be an elliptical shape or another appropriate shape.

Each of the torsion bars 13a and 13b have one end coupled to the micro mirror 9 and the other end, beyond the coupling portion with the rectangular piezoelectric actuator 10, to the movable frame 2a. Thus, the torsion bars 13a and 13b are coupled to the movable frame 2a, thereby stabilizing the reciprocal rotation of the micro mirror 9 around the Y-axis.

The rectangular piezoelectric actuator 10 is coupled to the torsion bars 13a and 13b on the Y-axis and is coupled to fixed bars 14a and 14b, which are parts of the movable frame 2a, on the X-axis. The fixed bars 14a and 14b are coupled to the meander-type piezoelectric actuator 6a and 6b at the other ends thereof, respectively.

With this configuration, when reflecting the laser beams 4a by the micro mirror 9, the two-dimensional optical deflector 2 projects light in front of the two-dimensional optical deflector 2 while being able to scan with light in two directions, the X-axis direction and the Y-axis direction.

Below the outer frame support 11, electrode pads 7a to 7e (hereinafter referred to as electrode pads 7) and electrode pads 8a to 8e (hereinafter referred to as electrode pads 8) are situated. The electrode pads 7 and 8 are electrically connected to respective electrodes of the meander-type piezoelectric actuators 6a and 6b and the rectangular piezoelectric actuator 10 so as to be able to apply driving voltages thereto.

Figure 3:
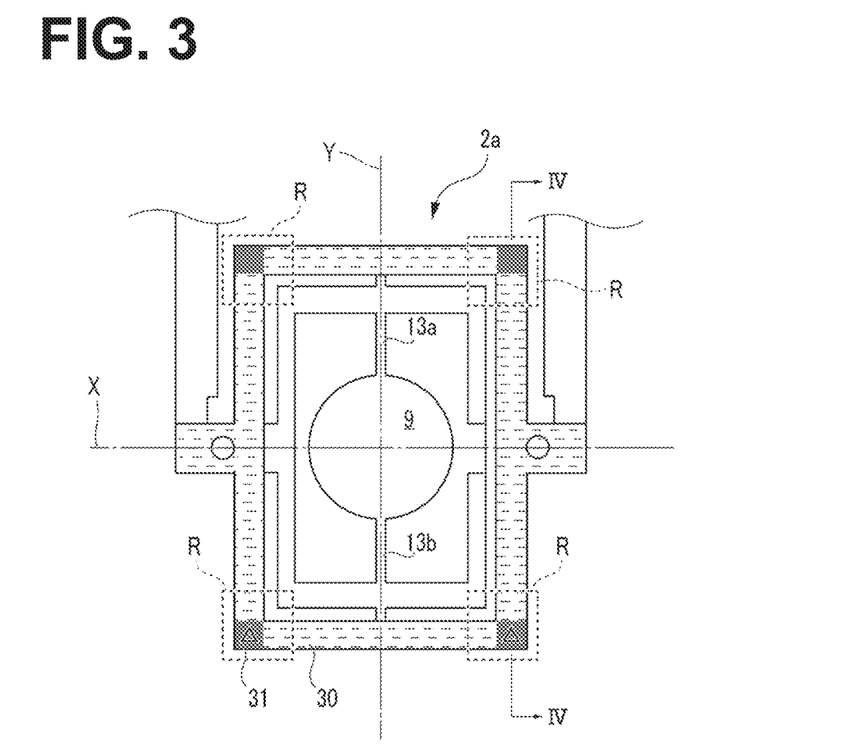
FIG. 3 is a diagram illustrating a movable frame of the two-dimensional optical deflector (rear surface side)
Figure 4:
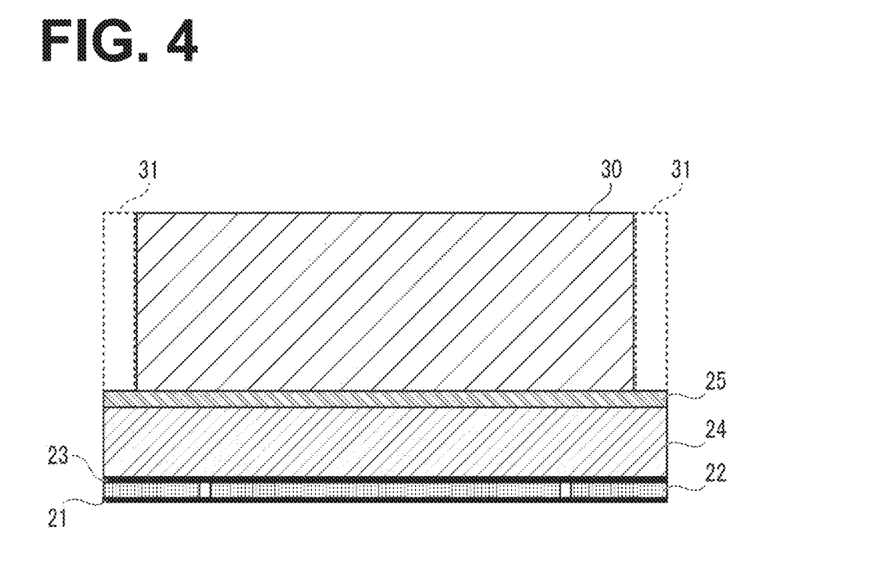
FIG. 4 is a cross-sectional view of the movable frame of FIG. 3 taken along line IV-IV.

With reference to FIG. 3 and FIG. 4, a detailed description will now be given of the movable frame 2a of the two-dimensional optical deflector 2.

FIG. 3 illustrates the rear surface side of the movable frame 2a. As illustrated in the drawing, the movable frame 2a is provided with ribs 30 on the rear surface of the movable frame 2a, in order to reinforce the strength. The corner regions R, at the four corners of the movable frame 2a, have removal regions 31 from which the ribs 30 have been partially removed. It should be noted that the removal region 31 may be a region where the rib 30 is not partially provided, that is, an absence region in which no rib 30 is provided. Such an absence region in the presently disclosed subject matter may include a region in which a rib with a thickness thinner than that of other regions is provided.

In FIG. 3, the removal region 31 is provided in a square (200 μm of one side) of a overlapping section in which two side sections having different directions overlap each other, among the four side sections (side sections in the vertical direction cover up to the portions of the fixed bars 14a and 14b) constituting the rib 30. The micro mirror 9 is driven (horizontally driven) around the Y-axis where the torsion bars 13a and 13b are present, but vibration generated during this action may propagate to the position of the X-axis, thereby causing abnormal vibration.

In this regard, since the rib 30 is interrupted by providing the removal region 31 in each of the corner regions R, the vibration caused by the micro mirror 9 being driven does not propagate to the position of the X-axis, thereby preventing abnormal vibration. The ribs 30 may preferably have a symmetrical shape with respect to the X-axis and/or the Y-axis. Thus, as compared to the case where the rib 30 has an asymmetrical shape, the rotation of the movable frame 2a around the Y-axis (tilt of the X-axis in the direction beyond the device surface) is suppressed, thereby preventing the propagation of vibration.

Various measurements had been conducted, and when the micro mirror 9 was driven horizontally, the inventor found a vibration mode affecting the operation of the meander-type piezoelectric actuators 6a and 6b(e.g., the second subharmonic of the 28th order vibration mode). Therefore, the absence regions where no rib 30 is partially provided are formed, so that the vibrations caused by the driving of the micro mirror 9 are prevented from propagating to the position of the X-axis.

FIG. 4 illustrates a cross-sectional view of the movable frame 2a of FIG. 3 taken along line IV-IV. The movable frame 2a is composed of an upper electrode layer 21 (0.15 μm), a PZT film 22 (5.0 μm), a lower electrode layer 23 (0.1 μm), a Si element layer 24 (50 μm), a Si oxide film 25 (1.0 μm), and a Si rib layer 30 (the rib 30 described above, with 130 μm thickness), in this order, from the lower side of the drawing (in actuality, from the surface side of the movable frame 2a). Note that the thickness of each thin film (layer) is merely an example, and not limited thereto.

The Si rib layer 30 is part of an SOI wafer and is a single crystal produced by a Czochralski method. The removal regions 31 at the four corners of the movable frame 2a are formed by etching. At this time, the Si oxide film 25 becomes an etching stop layer.

In FIG. 4, the end portion is a removal region 31, and the Si rib layer 30 has been removed. The removal region 31 may be in a state in which a predetermined thickness of the Si rib layer 30 remains, for example, 30 μm.

Figure 5A:
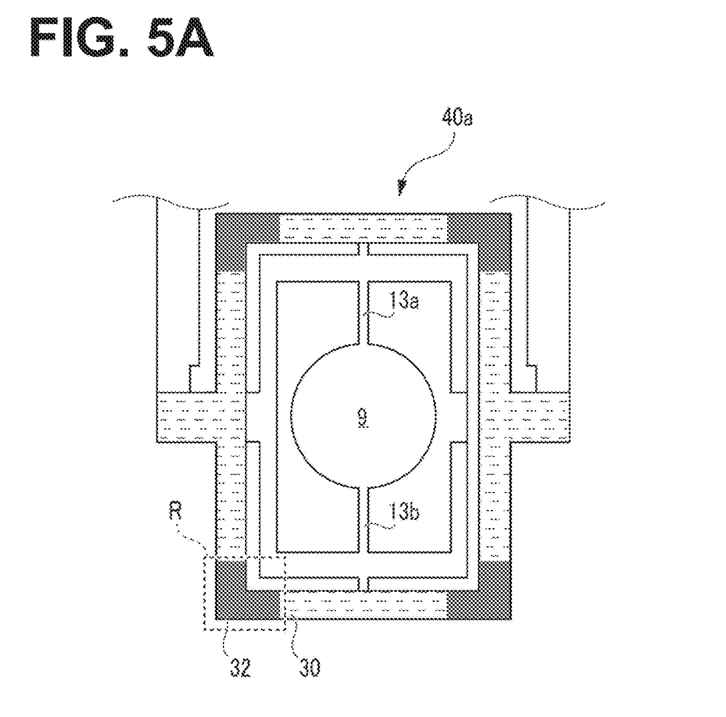
FIG. 5A is a diagram illustrating an example of a movable frame in a modified mode (removal region: L-shaped)

As illustrated in FIG. 5A, the shapes of the removal regions of the rib 30 may be configured. FIG. 5A illustrates a movable frame 40a with L-shaped removal regions 32 in the corner regions R. The removal region 32 has a shape in which the rib 30 has been removed to a position 500 μm away from the corner end surface of the movable frame 40a in each direction. It should be noted that the removal region 32 may be any shape as long as the rib 30 is not provided, that is, a region in which no rib 30 is present.

When a removal region 32 wider than the removal region 31 illustrated in FIG. 3 is formed, the end portion of the movable frame 40a (corner region R) is facilitated to move so as to serve as a spring. As a result, since the vibration energy of the micro mirror 9 is consumed at that end, the vibration generated by horizontal driving is less likely to propagate to the position of the X-axis.

Figure 5B:
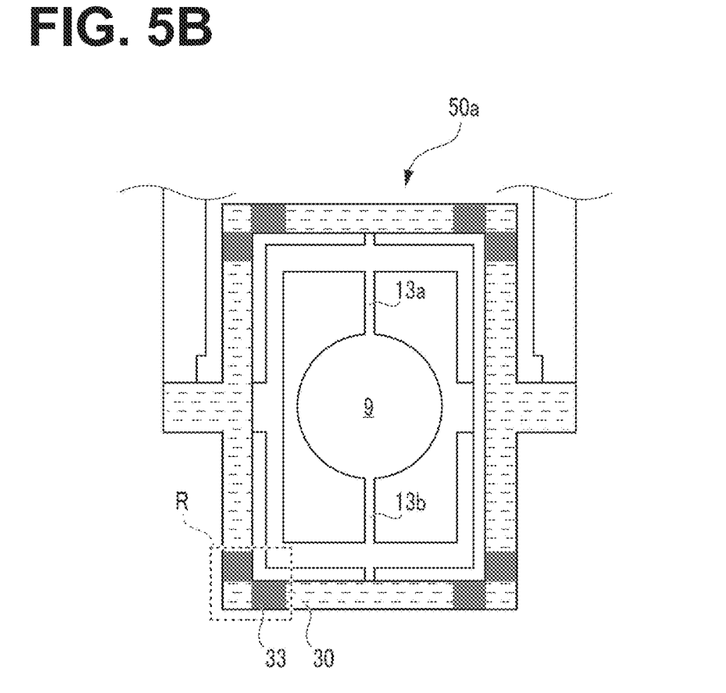
FIG. 5B is a diagram illustrating an example of a movable frame in a modified mode (removal region: L-shape without removing corner rib)

FIG. 5B illustrates the movable frame 50a with removal regions 33 in the corner regions R. The removal region 33 is formed by leaving a square (200 μm of one side) of the rib 30 at the corner portion of the movable frame 50a in the (L-shaped) removal region 32 in FIG. 5A. It should be noted that the removal region 33 may be of any shape region as long as the rib 30 is not provided, that is, a region in which no rib 30 is present.

As described above, the removal region 33 can be an absence region where no rib is provided or a rib with a thickness thinner than that of other regions is provided. Thus, the thickness of the removal region 33 is preferably thinner than that of the rib 30 because it is only required that the region is relatively softer than the rib 30. Also, the thickness of the square portion may be equal to or greater than the thickness of the removal region 33.

In the removal region 33, the end of the movable frame 50a can serve as a weight in addition to serving as a spring by leaving the square portion. That is, the weight of the end portion is increased and the local vibration is amplified. Thus, it is possible to suppress the phenomenon of the vibration generated by the horizontal driving propagating to the position of the X-axis.

Next, with reference to FIG. 6A, FIG. 6B, and FIG. 7, results of the vibration simulation of multiple types of movable frames with differently shaped removal regions of the ribs will be described.

Figure 6A:
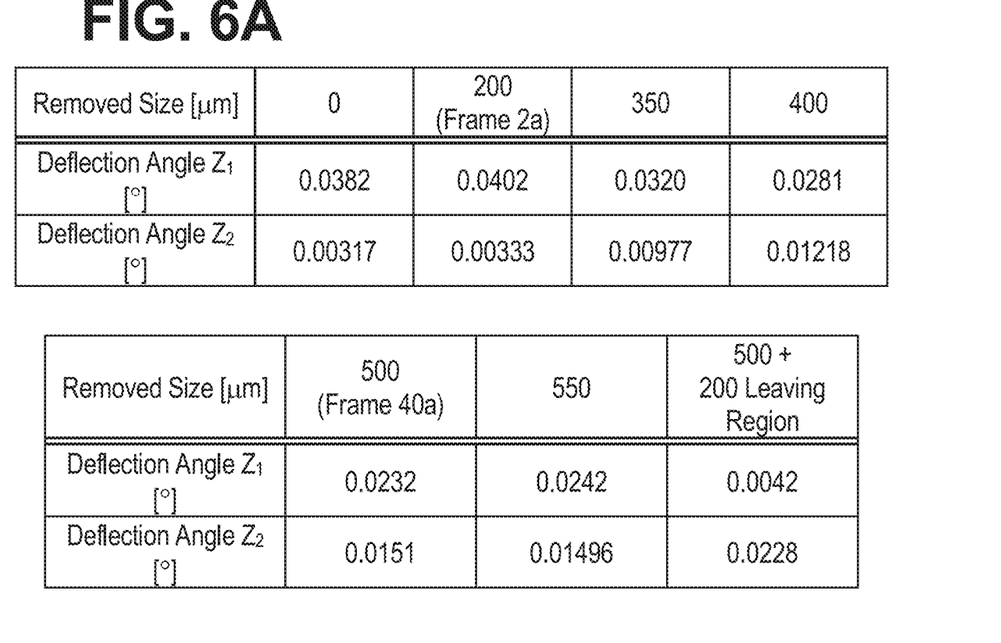
FIG. 6A is a list showing vibration simulation results of movable frames with different removal regions (numerical list)

FIG. 6A is a list showing the relation between the removed sizes (μm) of the rib 30, the deflection angle $Z_1$ (°) of the vertical drive unit (meander-type piezoelectric actuators 6a and 6b) with the Y-axis as the rotation axis, and the deflection angle $Z_2$ (°) of the end portion of the movable frame with the Y-axis as the rotation axis.

In the example of the movable frame 2a of FIG. 3, the angles at two points on the X-axis when symmetrical with respect to the Y-axis (marked with "circle (○)" in the figure) were measured as the deflection angle $Z_1$, and the angles at two points of the corner region R when symmetrical with respect to the Y-axis (marked with "triangle (Δ)" in the figure) were measured as deflection angle $Z_2$. It should be noted that the deflection angle is a value normalized by the deflection angle of the micro mirror 9, i.e., the deflection angle per 1° of the mirror deflection angle.

The removed size of the rib 30 is the distance from the end face of the movable frame, and is 200 (μm) which is equal to the removal region 31 of the movable frame 2a (see FIG. 4). At this time, the deflection angle $Z_1$ was 0.0402° and the deflection angle $Z_2$ was 0.00333°.

The removed size of 500 (µm) is equal to the removal region 32 of the movable frame 40a (see FIG. 5A). At this time, the deflection angle $Z_1$ was 0.0232° and the deflection angle $Z_2$ was 0.0151°. The sum of the removed size of 500 (µm) and leaving region of 200 (µm) is equal to the removal region 33 of the movable frame 50a (see FIG. 5B). At this time, the deflection angle $Z_1$ was 0.0042° and the deflection angle $Z_2$ was 0.0228°.

Figure 6B:
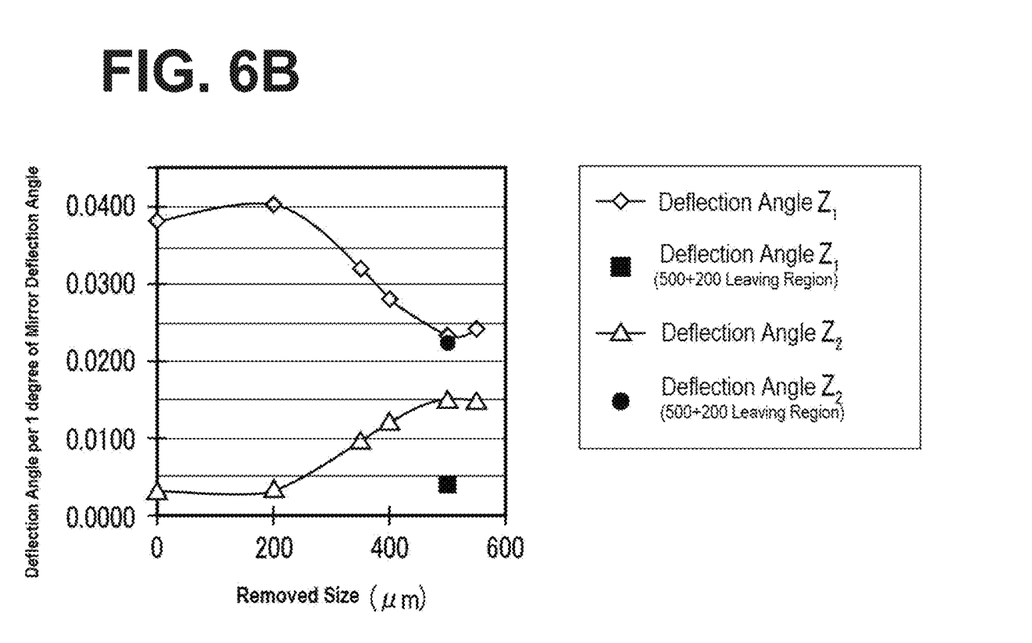
FIG. 6B is a graph showing vibration simulation results of movable frames with different removal regions.

FIG. 6B is a graph in which the removed size (µm) of the rib 30 is plotted on the horizontal axis, and the deflection angle $Z_1$ (°) and deflection angle $Z_2$ (°) on the vertical axis.

As shown in the graph, by increasing the removed size of the rib 30, the value of the deflection angle $Z_1$ is reduced, and becomes a minimum value at the removed size of 500 (µm). On the other hand, by increasing the removed size of the rib 30, there is a tendency of increasing the value of the deflection angle $Z_2$.

Further, it has been found that, when the removed size of 500 (µm) and leaving region of 200 (µm) was adopted, the deflection angle $Z_1$ takes the smallest value (0.0042°) and was about 11% of that of the conventional movable frame without removal regions.

It has been found that when the end portion (corner region) of the movable frame was vibrated so that the deflection angle $Z_2$ of the X-axis per 1° of the mirror deflection angle was 0.0353° or less, the reduction of the deflection angle of the micro mirror 9 was suppressed, thereby preventing the occurrence of abnormal vibrations.

The smaller the deflection angle $Z_1$, the better. This is because the vibration propagating to the vertical drive unit (meander-type piezoelectric actuators 6a and 6b) becomes small, and abnormal vibration is less likely to occur.

Figure 7:
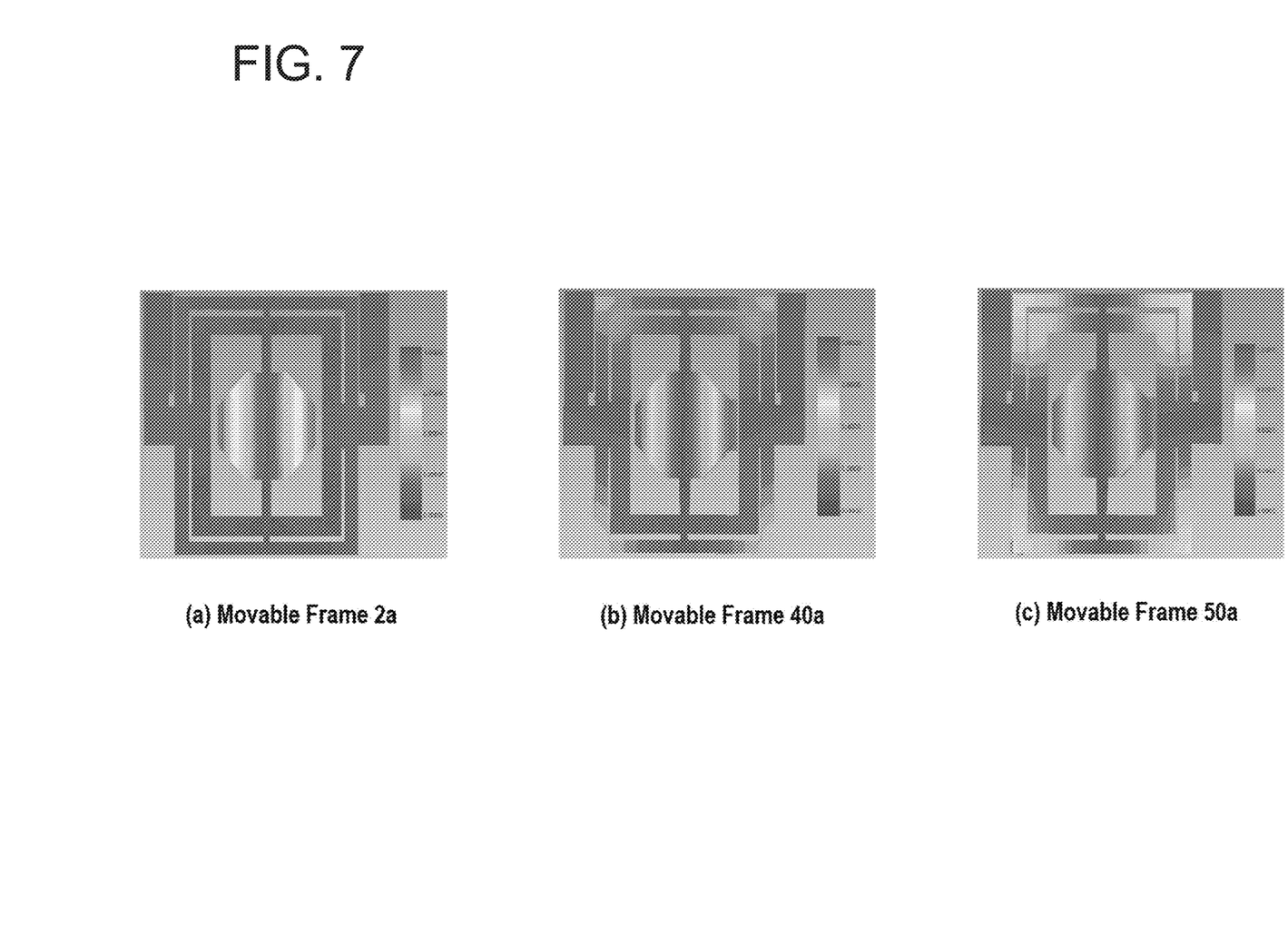
FIG. 7 includes an image (a) showing vibration simulation results of a movable frame (displacement amount distribution), an image (b) showing vibration simulation results of a movable frame loyal region: L-shape) (displacement amount distribution), and an image (c) vibration simulation results of a movable frame (removal region: L-shape without removing corner rib) (displacement amount distribution).

FIG. 7 shows the vibration simulation results (displacement amount distribution) of the three types of movable frames in which shapes of the removal regions of the rib 30 are different.

The image (a) of FIG. 7 is a displacement amount distribution of the movable frame 2a (see FIG. 3), the image (b) a displacement amount distribution of the movable frame 40a (see FIG. 5A), and the image (c) a displacement amount distribution of the movable frame 50a (see FIG. 5B).

As seen from the images, it has been found that the displacement of the four corners of the movable frame (corner region R) is greater in the movable frame 40a than in the movable frame 2a, and the displacement of the four corners is greater in the movable frame 50a than in the movable frame 40a. On the other hand, it has been found that no large displacement in the vertical drive axis (X-axis) occurred in any cases. As described above, it is confirmed that the provision of the removal regions 31 (removal regions 32 and 33) to the rib 30 can show the advantageous effects so that abnormal vibration is prevented from propagating.

The embodiments for carrying out the presently disclosed subject matter have been described above, but the presently disclosed subject matter is not limited to the above-described embodiments, and can be modified as appropriate without departing from the scope of the presently disclosed subject matter.

The two-dimensional optical deflector 2 of the present embodiment includes the movable frame 2a and the rectangular piezoelectric actuator 10 with the same shape (rectangular), but they may have different shapes. General two-dimensional optical deflectors include a movable frame with a rectangular shape, and a piezoelectric actuator of a horizontal drive unit surrounding a micro mirror, so as to have an annular structure. In such general deflectors, the rib 30 can be provided on the rear surface of the movable frame, and the corner regions R can include removal regions of the rib 30.

Further, regardless of the shape of the movable frame, when the removal regions of the rib are formed in the region between the horizontal drive axis and the vertical drive axis, it is possible to prevent the phenomenon that the vibration caused by the horizontal drive propagates to the vertical drive axis.

All related art references described above are hereby incorporated in their entirety by reference.

What is claimed is:

1. An optical scanning device comprising:
   a mirror unit configured to reflect light beams;
   a first drive unit configured to rotate the mirror unit around a first drive axis;
   a movable frame that is connected to the mirror unit on the first drive axis and is disposed around the mirror unit; and
   a second drive unit that is connected to the movable frame on a second drive axis perpendicular to the first drive axis, the second drive unit being configured to rotate the mirror unit around the second drive axis, wherein
   the movable frame has a rectangular shape and has a rib that is provided on a rear surface of the movable frame, and
   corner regions of four corners of the movable frame have an absence region which is any one of a region where no rib is partially provided and a region where a rib with a thickness thinner than other regions is provided.

2. The optical scanning device according to claim 1, wherein the absence region is provided in an overlapping section where, among four side sections constituting the rib, two side sections in different directions are overlapped with each other.

3. The optical scanning device according to claim 2, wherein the absence region is a region that is a combination of the overlapping section and a side section with a predetermined length extending from the overlapping section.

4. The optical scanning device according to claim 1, wherein the absence region is provided in a side section with a predetermined length extending from an overlapping section where, among four side sections constituting the rib, two side sections in different directions are overlapped with each other, except for the overlapping section.

5. The optical scanning device according to claim 1, wherein the corner region is disposed so that a value of a deflection angle of the second drive axis per 1 degree of a deflection angle of the mirror unit is equal to or less than 0.0353 degrees.

6. The optical scanning device according to claim 2, wherein the corner region is disposed so that a value of a deflection angle of the second drive axis per 1 degree of a deflection angle of the mirror unit is equal to or less than 0.0353 degrees.

7. The optical scanning device according to claim 3, wherein the corner region is disposed so that a value of a deflection angle of the second drive axis per 1 degree of a deflection angle of the mirror unit is equal to or less than 0.0353 degrees.

8. The optical scanning device according to claim 4, wherein the corner region is disposed so that a value of a deflection angle of the second drive axis per 1 degree of a deflection angle of the mirror unit is equal to or less than 0.0353 degrees.

* * * * *